US012640516B2

(12) United States Patent
Kopinski et al.

(10) Patent No.: US 12,640,516 B2
(45) Date of Patent: May 26, 2026

(54) ELECTRIC CONNECTOR WITH AN ANTI-VIBRATION MECHANISM

(71) Applicant: Tyco Electronics UK LTD, Swindon (GB)

(72) Inventors: Tomasz Kopinski, Swindon (GB); Jonathan Mark Eyles, Swindon (GB)

(73) Assignee: Tyco Electronics UK Ltd., Swindon (GB)

( * ) Notice: Subject to any disclaimer, the term of this patent is extended or adjusted under 35 U.S.C. 154(b) by 532 days.

(21) Appl. No.: 18/081,898

(22) Filed: Dec. 15, 2022

(65) Prior Publication Data

US 2023/0198203 A1 Jun. 22, 2023

(30) Foreign Application Priority Data

Dec. 17, 2021 (EP) .................................... 21215656

(51) Int. Cl.

*H01R 13/627* (2006.01)
*H01R 13/533* (2006.01)
*H01R 13/639* (2006.01)
*H01R 24/40* (2011.01)

(52) U.S. Cl.

CPC ....... *H01R 13/6273* (2013.01); *H01R 13/533* (2013.01); *H01R 13/639* (2013.01); *H01R 24/40* (2013.01)

(58) Field of Classification Search

CPC ......................... H01R 13/6273; H01R 13/533; H01R 13/639; H01R 13/6271; H01R 24/40; H01R 13/622; H01R 13/623; H01R 13/20

See application file for complete search history.

(56) References Cited

U.S. PATENT DOCUMENTS

| | | | | |
|---|---|---|---|---|
| 4,291,933 A * | 9/1981 | Kakaris | H01R 13/622 | 439/321 |
| 4,457,469 A | 7/1984 | Ratchford | | |
| 4,462,652 A | 7/1984 | Werth et al. | | |
| 4,484,790 A * | 11/1984 | Schildkraut | H01R 13/622 | 439/312 |
| 5,215,336 A * | 6/1993 | Worthing | F16L 19/005 | 411/937 |

(Continued)

FOREIGN PATENT DOCUMENTS

GB 2243035 A 10/1991

OTHER PUBLICATIONS

Extended European Search Report, Application No. 21215656.6-1201, Dated: Jun. 27, 2022, 13 pages.

*Primary Examiner* — Carlos E Lopez-Pagan
(74) *Attorney, Agent, or Firm* — Barley Snyder

(57) ABSTRACT

An electric connector connectable to a mating electric connector includes and inner part, an outer part and a self-locking mechanism. The inner part is adapted to be connected to an electrical conductor. The outer part is adapted to connect to the mating electric connector. The inner and outer parts are connected coaxially and rotatably to one another. The self-locking mechanism selectively blocks rotation of one of the inner or outer parts with respect to the other one of the inner or outer parts in a first circumferential direction, and permits rotation of one of the inner or outer parts with respect to the other one of the inner or outer parts in a second circumferential direction opposite the first circumferential direction.

20 Claims, 7 Drawing Sheets

(56) References Cited

U.S. PATENT DOCUMENTS

| | | | | |
|---|---|---|---|---|
| 5,590,228 | A | 12/1996 | Gibola et al. | |
| 7,905,741 | B1 * | 3/2011 | Wade | H01R 13/639 439/321 |
| 9,666,973 | B1 * | 5/2017 | Strahl | H01R 13/622 |
| 9,887,494 | B2 * | 2/2018 | Leroyer | H01R 13/533 |
| 2004/0033711 | A1 | 2/2004 | Loveless et al. | |
| 2015/0340805 | A1 * | 11/2015 | Jordan | H01R 13/639 439/338 |

* cited by examiner

ELECTRIC CONNECTOR WITH AN ANTI-VIBRATION MECHANISM

CROSS-REFERENCE TO RELATED APPLICATIONS

This application claims the benefit of European Patent Application No. 21215656.6, filed on Dec. 17, 2021, the whole disclosure of which is incorporated herein by reference.

FIELD OF THE INVENTION

The present invention relates to an electric connector and an electric assembly.

BACKGROUND

In various fields of application, e.g., in the field of aviation, electric connectors are exposed to vibrations. A secure connection between an electric connector and a mating electric connector is required, even under harsh environmental conditions. In the art, various techniques such as thread-lockers or a wire tie are known to ensure that fasteners do not loosen under vibration and a stable electric joint for the life of the electric connector. Prior art solutions thus have the drawback of increased installation time and the need for specific tools for installation and maintenance. Other prior art solutions apply a hardening, sealing liquid. This sealing liquid, however, needs to be removed for inspection and maintenance, which is time-consuming and costly.

There is a need for a connector that facilitates maintenance and, at the same time, a vibration-proof connection to the mating connector.

SUMMARY

According to an embodiment of the present disclosure, an electric connector connectable to a mating electric connector includes and inner part, an outer part, and a self-locking mechanism. The inner part is adapted to be connected to an electrical conductor. The outer part is adapted to connect to the mating electric connector. The inner and outer parts are connected coaxially and rotatably to one another. The self-locking mechanism selectively blocks rotation of one of the inner or outer parts with respect to the other one of the inner or outer parts in a first circumferential direction, and permits rotation of one of the inner or outer parts with respect to the other one of the inner or outer parts in a second circumferential direction opposite the first circumferential direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
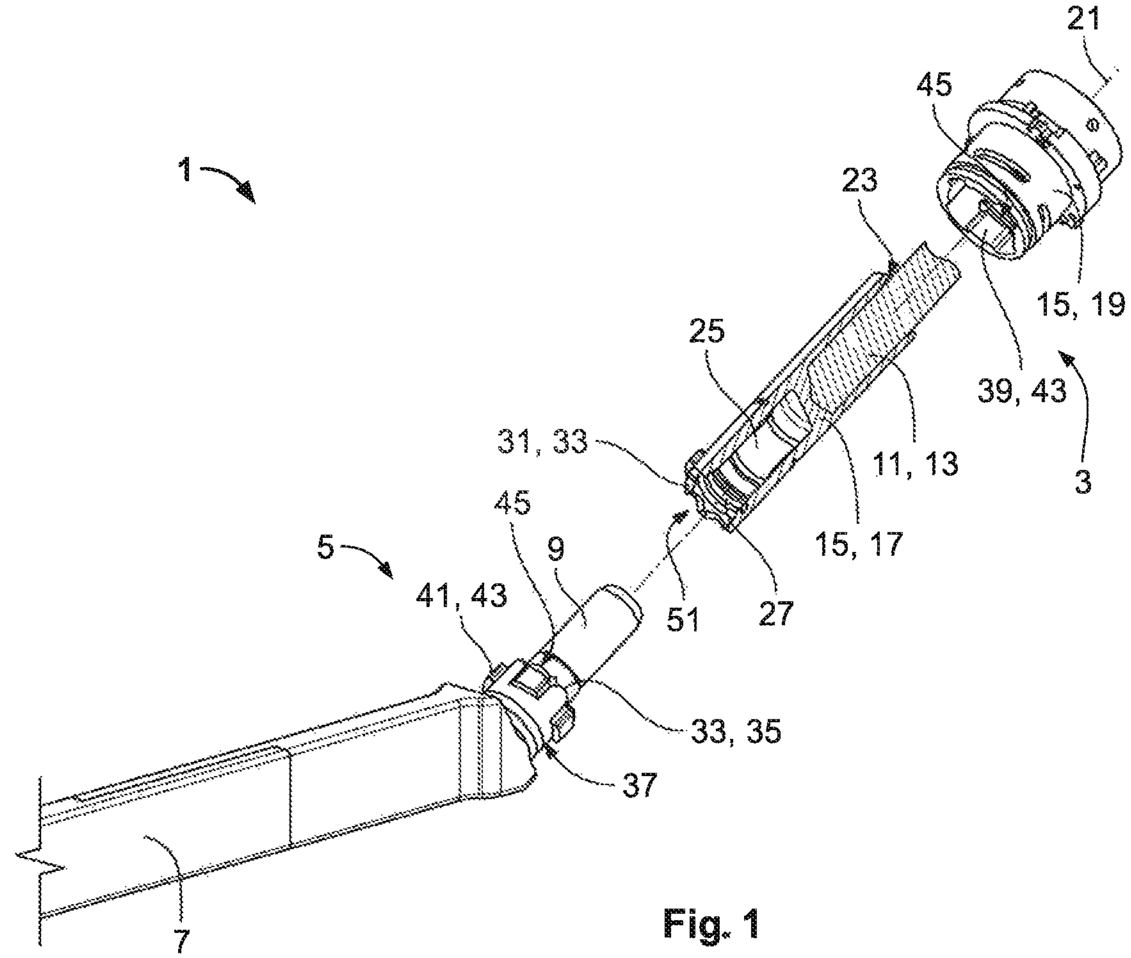
FIG. 1 is a perspective, partially cut view of the inventive electric assembly.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

FIG. 1 shows an electrical assembly 1 that comprises an electric connector 3 and a mating electric connector 5. The mating electric connector 5 may comprise a busbar 7 and a conductive pin 9. The pin 9 is configured to be connected to an electric conductor 11, in particular to a flexible electric conductor 13.

The electric connector 3 for connecting to the mating electrical connector 5 comprises two parts 15. The two parts 15 being an inner part 17 and an outer part 19, wherein one of the two parts 15 is configured to be connected to the electrical conductor 11 and the other one of the two parts 15 is configured to be connected to the mating electrical connector 5. In the embodiment shown, the one of the two parts 15 is the inner part 17 and the other one of the two parts 15 is the outer part 19. The exploded view shows that the two parts 15 are connected coaxially with respect to an axis 21 and rotatably to one another.

The flexible electric conductor 13 is terminated in a crimp barrel 23. In the crimp barrel 23, an electrical contact 25 having a low resistance is provided. Via this electrical contact 25 an electric connection between the pin 9 and the inner part 17 is established. The electric connector 3 further comprises an O-ring 27 providing an environmental seal for sealing purposes. To ensure a stable resistance in service, any movement between the pin 9 and the inner part 17 must be eliminated at the contact interface 29 (see FIG. 4). Relative movement between the pin 9 and the inner part 17 may result in fretting corrosion at the contact interface 29 which may lead to an increase in resistance. A movement along the axis 21 between pin 9 and the inner part 17 is prevented by the outer part 19, as will be described herein.

To connect the electric connector 3 to the mating electric connector 5, in particular to connect the outer part 19 to the mating electric connector 5, the electric connector 3 comprises at least one anti-rotation element 31 that is arranged at the one part 15 of the two parts 15 which is configured to be connected to the conductor 11. In the embodiment shown, the inner part 17 comprises a multitude of anti-rotation elements 31. These anti-rotation elements 31 are provided in the form of anti-rotation teeth 33. These anti-rotation elements 31 are configured to be engaged with a complementary anti-rotation element 35 of the mating electrical connector 5.

The complementary anti-rotation elements 35 are also formed as anti-rotation teeth 33. Upon engagement of the anti-rotation elements 31 with the complementary anti-rotation elements 35, a relative rotation between the one part 15, i.e., the inner part 17 in the embodiment shown, and the mating electric connector 5. During insertion of the pin 9 in the inner part 17, the anti-rotation elements 31 are located between the corresponding complementary anti-rotation elements 35. When the outer part 19 is rotated with respect to the inner part 17, these anti-rotation elements 31, 35 block a rotational movement between the inner part 17 and outer part 19. To confirm that the anti-rotation elements 31, 35 are correctly engaged, a visual indicator band 37 must be covered. In other embodiments, the visual indicator band 37 may be provided in a different form, for instance as stripes, dots, different patterns or even detection means configured to output and alert signal and/or status signals representing a correct or incorrect engagement of the anti-rotation elements 31, 35. Further, the one of the two parts 15 that is configured to be connected to the mating electric connector 5, i.e., the outer part 19, comprises at least one latching element 39 that is configured to fix the electric connector 3 to the mating electric connector 5 by rotation of said one of the two parts 15, 19 with respect to mating electric connector 5.

The pin 9 comprises four complementary latching elements 41 and the outer part 19 also comprises a corresponding set of latching elements 39. The latching elements the 39, 41 are blocks 43 with individual ramped surfaces 45. Each individual ramped surface 45 has a helical pitch that may exemplarily amount to approximately 5 mm. The blocks 43 on the outer part 19 and pin 9 are sized such that the blocks 43 can slide between one another in only one orientation. The outer part 19 is adapted to be moved towards the pin 9, thereby also moving the inner part 17 towards the pin 9. The latching elements 39 are moved in between the complementary latching elements 41 until a rotation of the outer part 19 with respect to the pin 9 is possible. In this position, the anti-rotation elements 31 are engaged with the complementary anti-rotation elements 35 preventing a rotation of the inner part 17 with respect to the pin 9.

Figure 2:
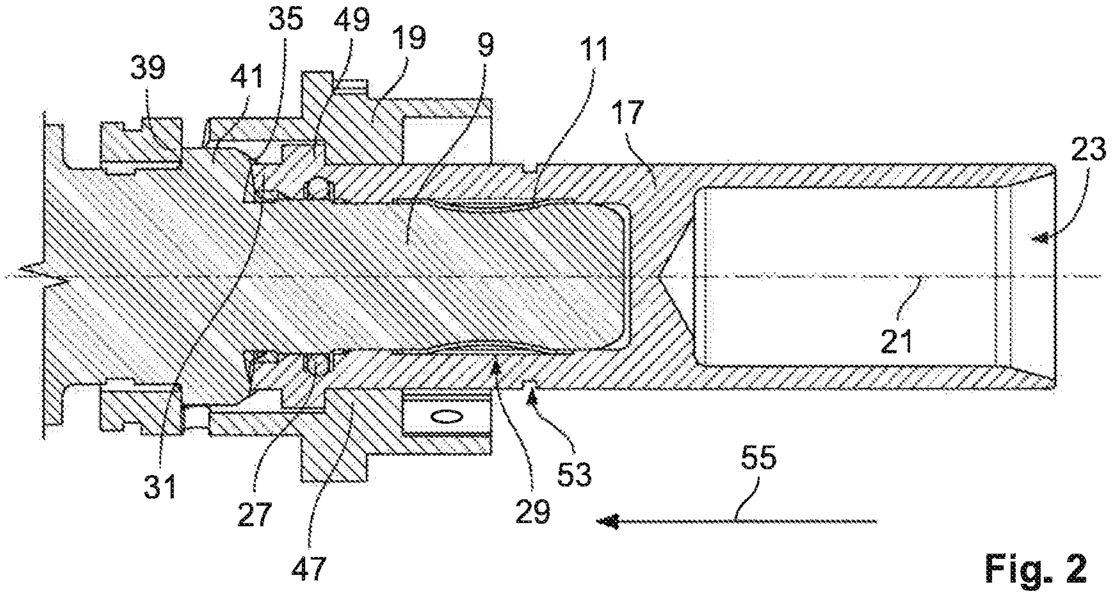
FIG. 2 is a cut side view of the electric assembly, wherein the electric connector is connected to the mating electric connector.

If the outer part 19 is rotated the ramped surfaces 45 are brought into contact. Continued rotation pulls the outer part 19 towards the pin 9. This, in turn, pulls the inner part 17 towards the pin 9 because of a shoulder 47 of the outer part 19 that supports a protrusion 49 of the inner part 17. This is shown in FIG. 2. A rotation of the outer part 19 with respect to the pin 9 may be continued until all axial clearance is removed and the inner part 17 is clamped between the shoulder 47 of the outer part 19 and the complementary anti-rotation elements 35 that are present on a front face 51 (see FIG. 1) of the inner part 17. This continued rotation is only possible if the anti-rotation elements 31 are engaged with the complementary anti-rotation elements 35, because otherwise the latching elements 39 may not be moved behind the complementary latching elements 41 but rather abut the complementary latching elements 41.

As can be seen in FIG. 2, inner part 17 comprises a circumferential nut 53 that is adapted to receive a spring clip (not shown) in order to prevent inner part 17 from being moved out of outer part 19 in a plug direction 55.

Figure 3:
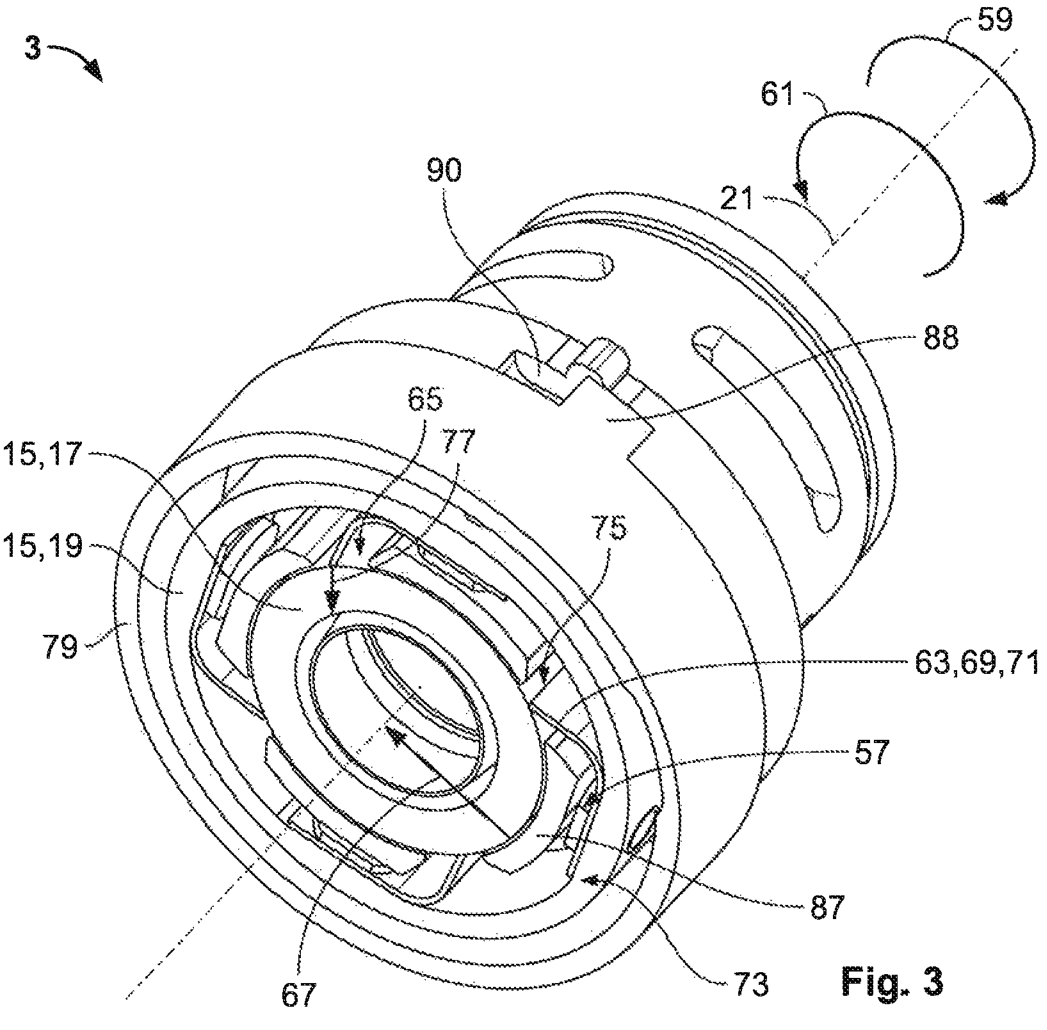
FIG. 3 is a detailed view of the electric connector showing the self-locking mechanism.

With reference to FIG. 3, the electric connector 3 further comprises a self-locking mechanism 57 that is configured to block a rotation of one of the two parts 15, in particular the inner part 17, with respect to the other one of the two parts 15, in particular the outer part 19 in a first circumferential direction 59 and to allow for a rotation of the inner part 17 with respect to the outer part 19 in a second circumferential direction 61 opposite the first circumferential direction 59. The self-locking mechanism 57 comprises at least one elastically deflectable locking element 63 that is pressed against a locking surface 65 in a radial direction 67. The radial direction 67 is directed radially inwards, wherein in different embodiments, it may be directed radially outwards. The locking surface 65 is a surface of one of the two parts 15 facing towards the other one of the two parts 15. The locking surface 65 is provided by inner part 17. The locking surface 65 is an even surface 66. The embodiment shown comprises four elastically deflectable locking elements 63 arranged circumferentially with an equal spacing to one another.

The locking elements 63 are stationary with respect to outer part 19. The locking elements 63 are springs 69, in particular leaf springs 71. The locking elements 63 are attached to the outer part 19 in a torsionally rigid manner at a first end 73 of the elastic locking elements 63 and slidingly abut the inner part 17 at a second end 75 of the elastic locking elements 63 opposite the first end 73. The first end 73 is located further in the second circumferential direction 61 than the second end 75.

The set of the four leaf or blade springs 71 attached to outer part 19, are employed to prevent outer part 19 from loosening under vibration. Leaf springs 71 are elastically deformed during assembly and apply a normal force 77 to locking surface 65 of inner part 17. During rotation in the second circumferential direction 61, leaf springs 71 are able to flex away from locking surface 65. As a result, the outer part 19 is able to spin freely on the inner part 17 during the locking operation. If a rotation in the first circumferential direction 59 is attempted, leaf springs 71 'bite' into the locking surface and thereby prevent relative rotation between outer part 19 and inner part 17.

As a relative rotation between inner part 17 and pin 9 is also blocked by the engagement of anti-rotation elements 31 with complementary anti-rotation elements 35, as explained above, a rotation between pin 9 and outer part 19 is not possible. As a result, the engagement between latching elements 39 and complementary latching elements 41 (the latching elements 39 and 41 comprising ramped surfaces 45 on pin 9 and outer part 19) is maintained and the connection of electrical assembly 1 is prevented from loosening once tightened. To enable a rotation of the outer part 19 with respect to the inner part 17 in the first circumferential direction 59 and to un-lock electrical assembly 1, leaf springs 71 must be disengaged from locking surface 65.

Still referring to FIG. 3, electric connector 3 further comprises a release collar 79 mounted to one of the two parts 15, wherein the release collar 79 is rotatable with respect to the two parts 15. Further, release collar 79 comprises at least one lifting element 81. Here, four lifting elements 81 are provided by release collar 79. The lifting elements 81 are configured to be moved in first circumferential direction 59 between the locking element 63 and the locking surface 65. As can be seen, the lifting elements 81 may be moved below the corresponding elastic locking element 63 in the second circumferential direction 61. In this position, lifting elements 81 are spaced apart from elastic locking elements 63. An equal number of locking elements 63 and lifting elements 81 are provided.

Figure 4:
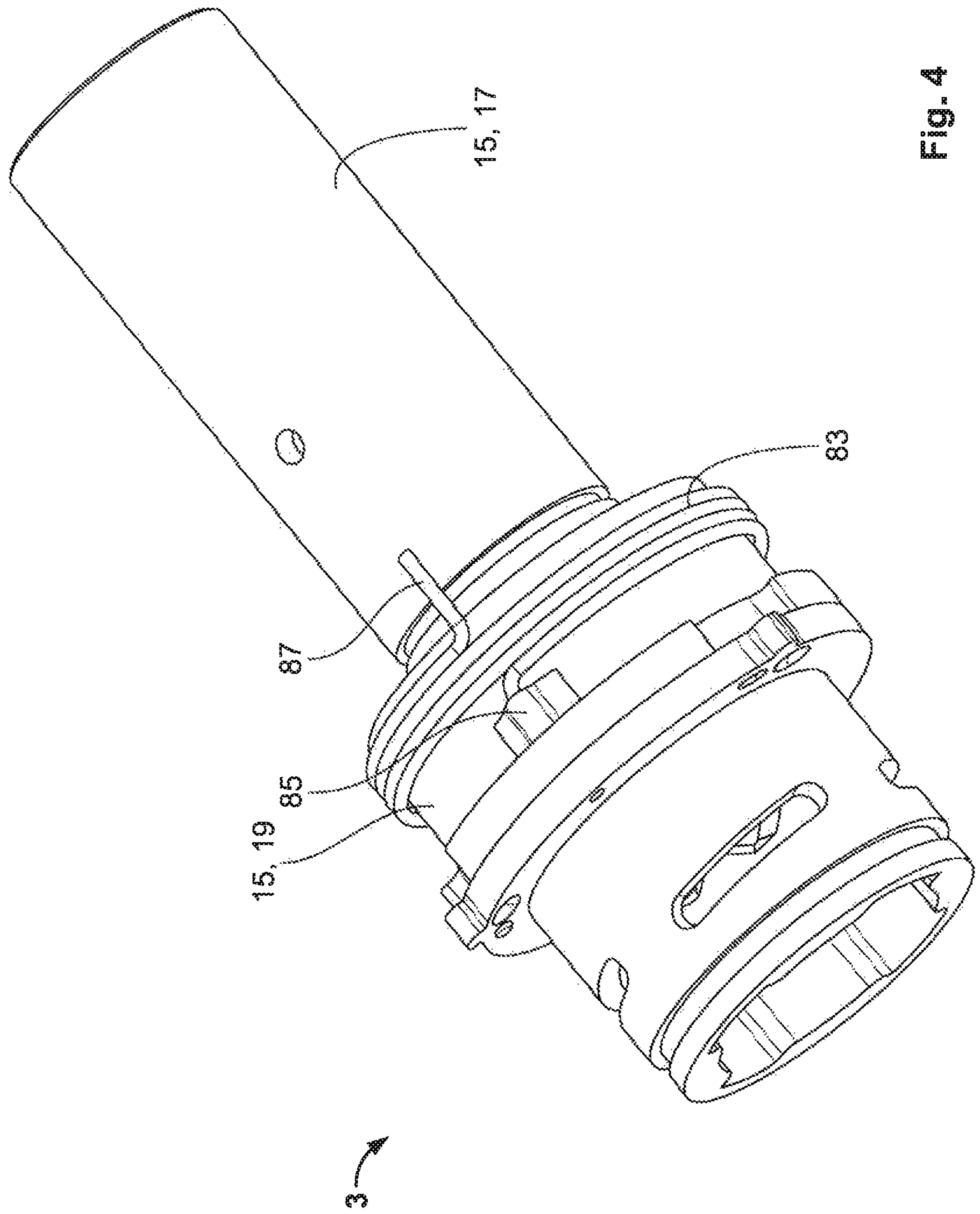
FIG. 4 is a further detailed view of the electric connector.

With reference to FIG. 4, release collar 79 is connected to one of the two parts 15, particularly to outer part 19 via a torsion spring 83. Thus, release collar 79 is resiliently held in one rotational position by torsion spring 83. It is to be noted that in FIG. 4; release collar 79 is not shown, wherein torsion spring 83 may be attached to release collar 79 similarly, as to outer part 19, i.e., exemplarily by a spring end receptacle 85 receiving an end 87 of torsion spring 83.

Again referencing FIG. 3, the release collar 79 comprises a release stop 88 that is configured to limit a rotational movement of release collar 79 with respect to outer part 19. The release stop 88 of the release collar 79 is received within a release stop recess 90 of the outer part 19. To disengage electric connector 3 from mating electric connector 5, release collar 79 is rotated in the first circumferential direction 59 by approximately 15 degrees. This rotation is performed against the resistance of the torsion spring 83. The lifting elements 81 on the release collar 79 lift the locking elements 63 from the locking surface 65. The release collar 79 must then be held in this position while outer part 19 is rotated a further 45 degrees (approximately) to disconnect latching elements 39 from complementary latching elements 41. The torsion spring 83 ensures that lifting elements 81 are positioned at a distance to the locking elements 63.

With reference to FIG. 5-9, a torque setting means 89 will be described. An angle of rotation to bring ramped surfaces 45 of pin 9 and outer part 19 into contact will vary depending on manufacturing tolerances, a set rotation cannot guarantee locking. A defined torque is a more reliable measure to ensure a secure lock between the pin 9 and the outer part 19. It guarantees that axial clearance is removed between components and a sufficient preload is applied to mitigate the risk of movement at the contact interface 29. To remove the necessity for tooling (i.e., in the form of a torque wrench), a torque setting means 89 is provided to control the torque applied when locking the electric connector 3 to the mating electric connector 5. The torque setting means 89 mechanism is contained within a handling sleeve 91.

The torque setting means 89 are attached to the outer part 19 by a washer 92 and a circlip 93. The handling sleeve 91 is configured to manually operate the electric connector 3 by a user, wherein the torque setting means 89 are configured to indicate in an audible and/or tactile and/or visible manner exceeding a pre-set torque that is transmitted from the handling sleeve 91 to the outer part 19. The torque setting means 89 comprise at least one torque transmission member 95. In the embodiment shown, three torque transmission members 95 are provided in the form of a set of ball bearings 97. The torque setting means 89 are configured to be released from an initial locking position 99 (see FIG. 8) against a resilient spring force if a predetermined torque is exceeded between the inner part 17 and the outer part of 19.

A second locking position 101 (see FIG. 9) is provided by the torque setting means 89, into which the torque transmission member 95 is moved from the initial locking position 99. This second locking position 101 may prevent unintentional disengagement of the electric connector 3 from the mating electric connector 5.

Figure 5:
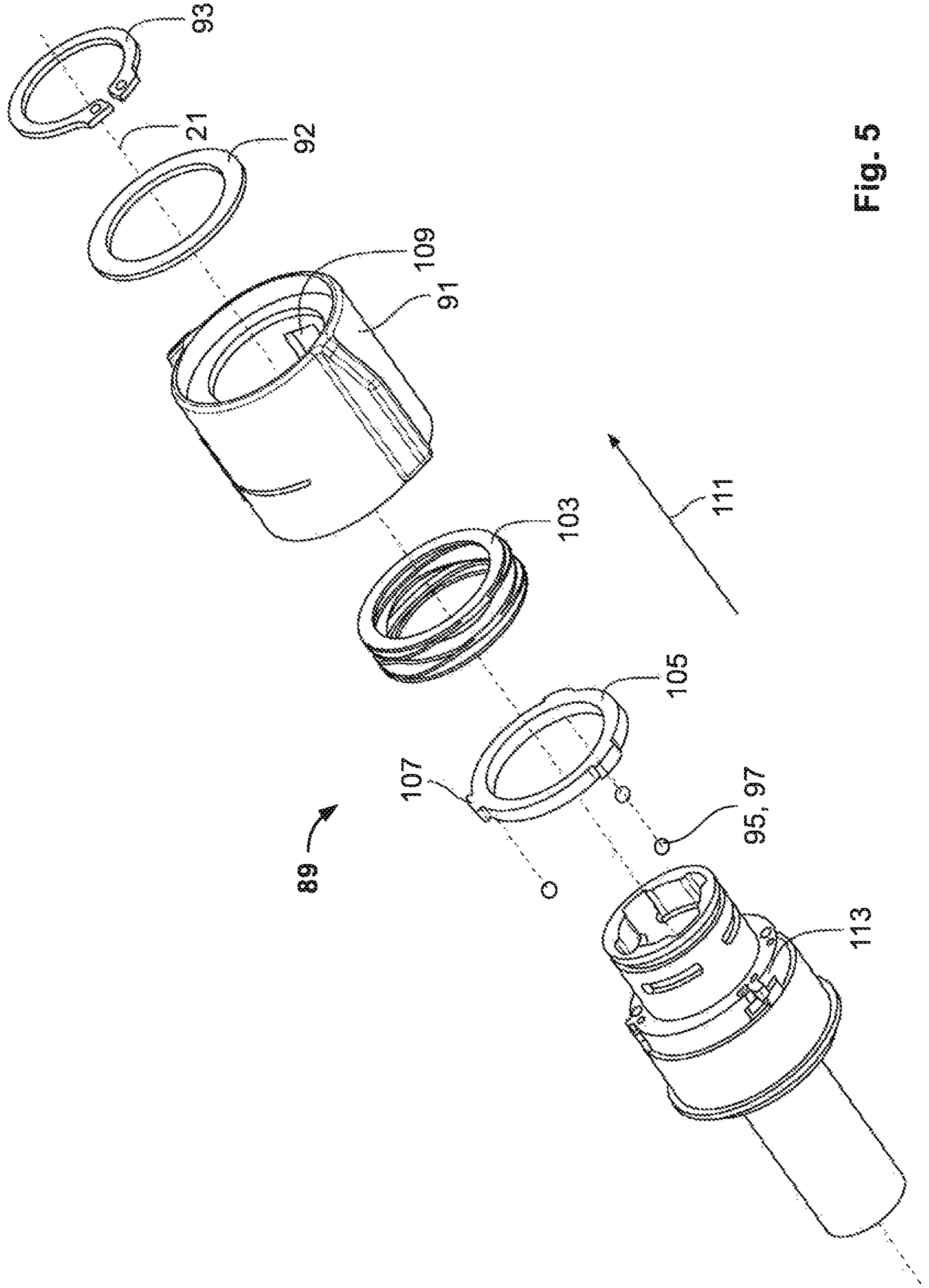
FIG. 5 is an exploded view of the electric connector with a torque setting means.

FIG. 5 shows an exploded view of the inventive electric connector 3 comprising the torque setting means 89. The torque setting means 89 comprises a wave spring 103 that is compressed during assembly of the electric connector 3. The set of ball bearings 97 apply a load normal to the surface of the outer part via a ball bearing retainer 105. The ball bearing retainer 105 and the handling sleeve 91 are connected by a set of ball retainer keys 107 and slots 109 provided in the handling sleeve 91. These slots 109 ensure that the handling sleeve 91 and the ball bearing retainer 105 and the set of ball bearings 97 always rotate together in a rotationally rigid manner.

The ball bearing retainer 105 may however be translated in an axial direction 111 (relative to the handling sleeve 91) as the wave spring 103 is compressed. The outer part 19 is also keyed to the same slots 109 of the handling sleeve 91, via a set of protrusions 113. the set of protrusions 113, however, are smaller in a circumferential direction than the ball retainer keys 107 and therefore allow for a relative movement of the outer part 19 with respect to the handling sleeve 91 over an angular range 123 of approximately 15°.

Figure 6:
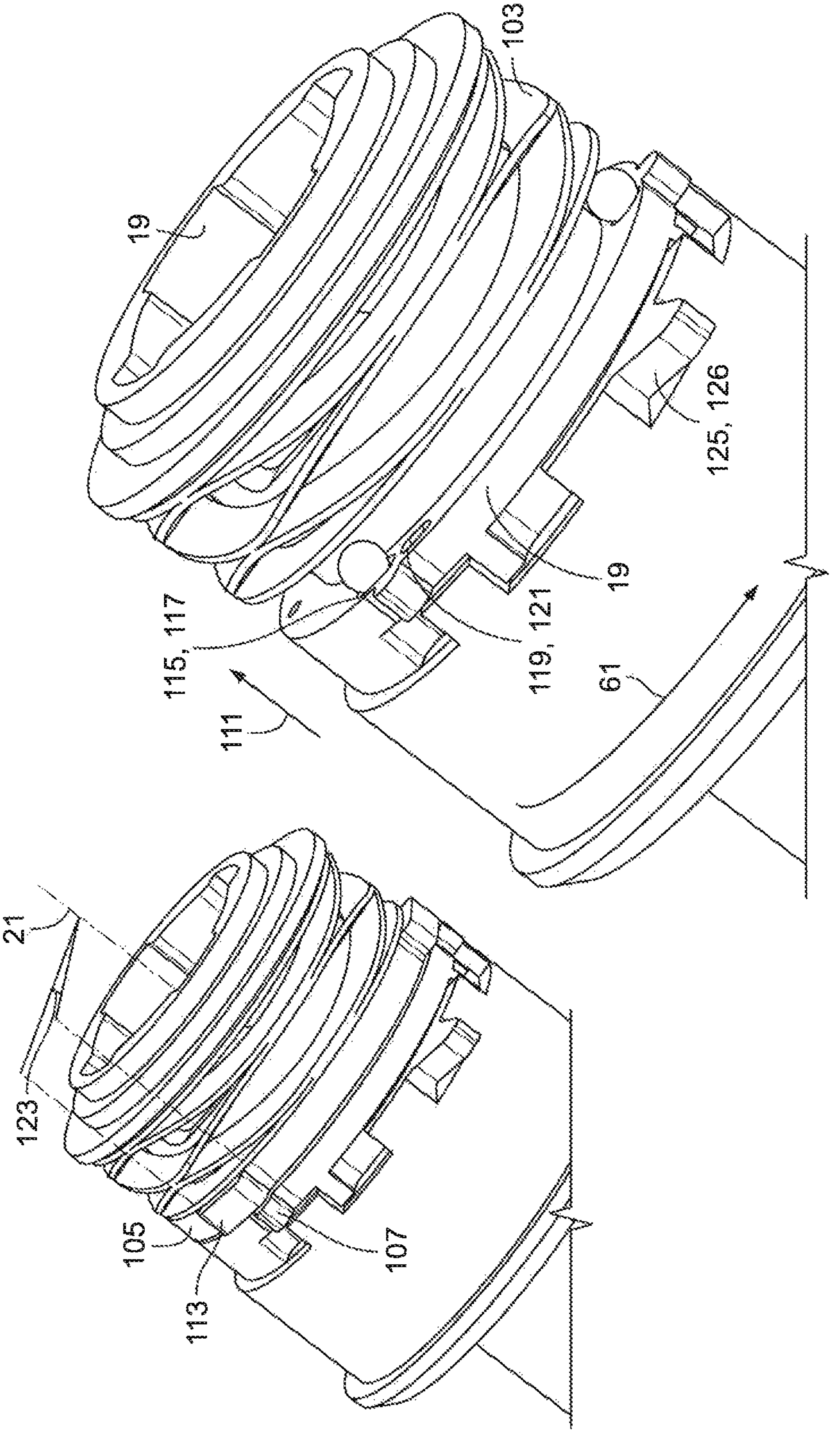
FIG. 6 is a detailed view of the torque setting means of the electric connector of FIG. 5.

As can be seen in FIG. 6, the ball bearings 97 may be located in a set of deep recesses 115 that are representative for an un-locked state 117. At the other end of the angular range 123 they are located in a set of shallow recesses 119 that are representative of a locked state 121. Further, a visual indicator member 125 is provided that is visible from outside the electrical connector 3, wherein a position of the visual indicator member 125 with respect to the handling sleeve 91 is representative for the torque setting means 89 being in the initial locking position 99 or the second locking position 101. This can best be seen when comparing FIG. 8 and FIG. 9. The torque setting means 89 are attached in a rotationally rigid manner to the outer part 19 until the predetermined torque is reached in the second circumferential direction 61.

To move from the un-locked state 117 to the locked state 121, rotation of the outer part must be impeded while handling sleeve 91 rotation continues. This enables a combined rotation of the handling sleeve 91 and the ball bearing retainer 105. If a pre-set torque is exceeded the ball bearings 97 may be pushed up ramped surfaces of the deep recesses 115 in the stationary outer part, thereby compressing the wave spring 103 in the axial direction 111. The ball bearings 97 are then, upon further rotation in the second circumferential direction 61, moved into the shallow recesses 119. The torque setting means 89 further comprises a limit stop 126 that is configured to limit a rotational movement of the handling sleeve 91 with respect to the outer part 19.

Figure 7:
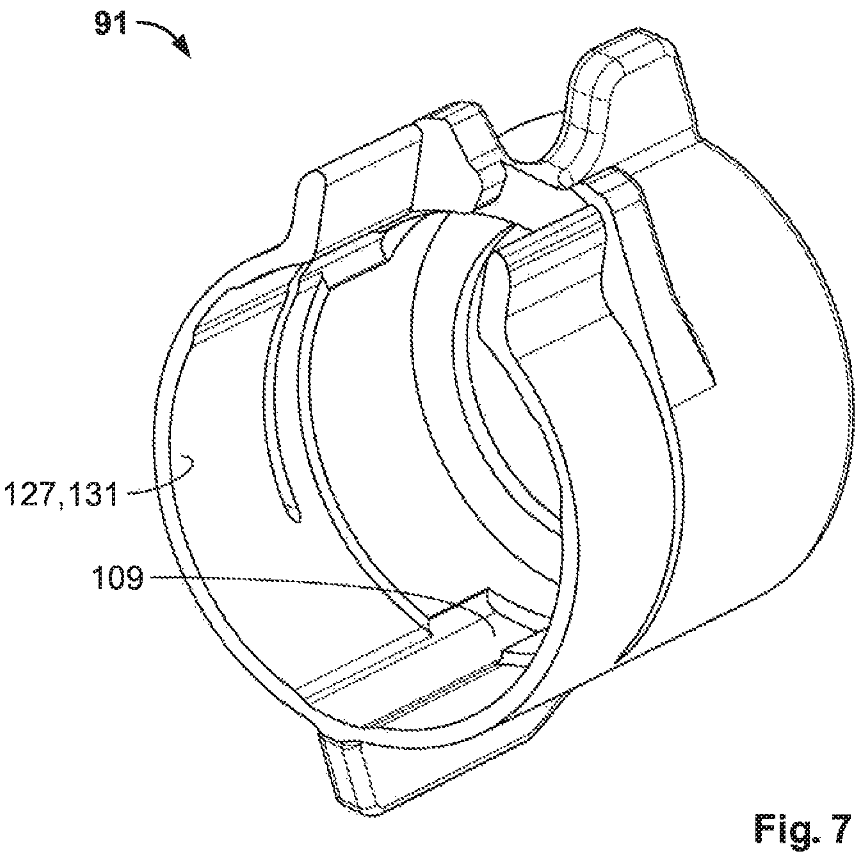
FIG. 7 is a detailed view of a handling sleeve of the torque setting means of FIG. 5.
Figure 9:
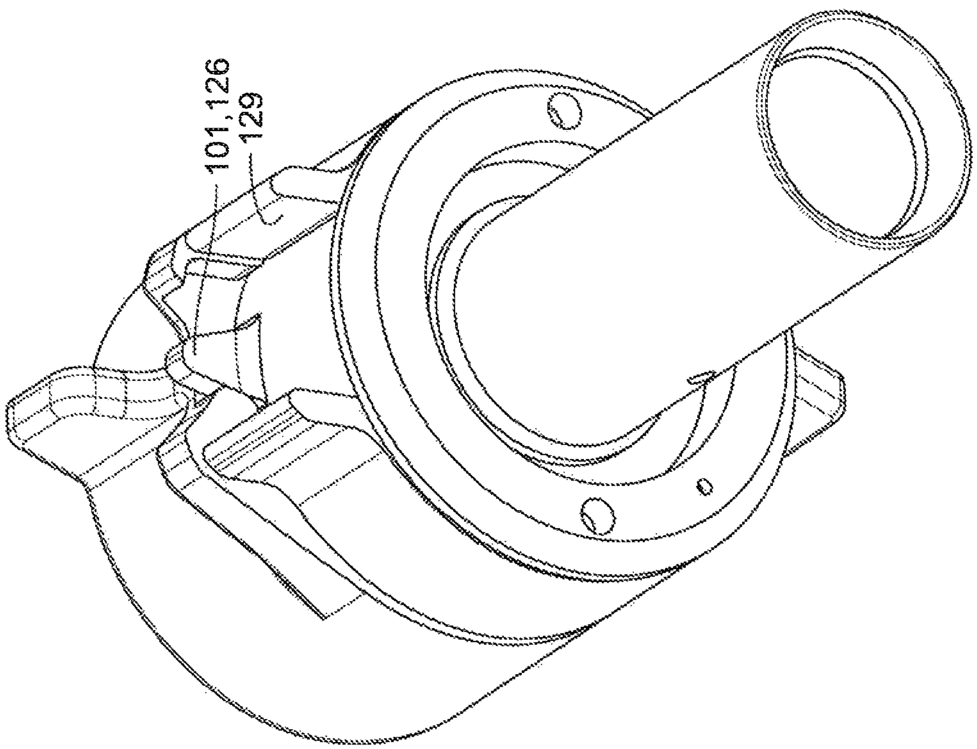
FIG. 9 illustrates the electric connector with the torque setting means in the second locking position.
Figure 8:
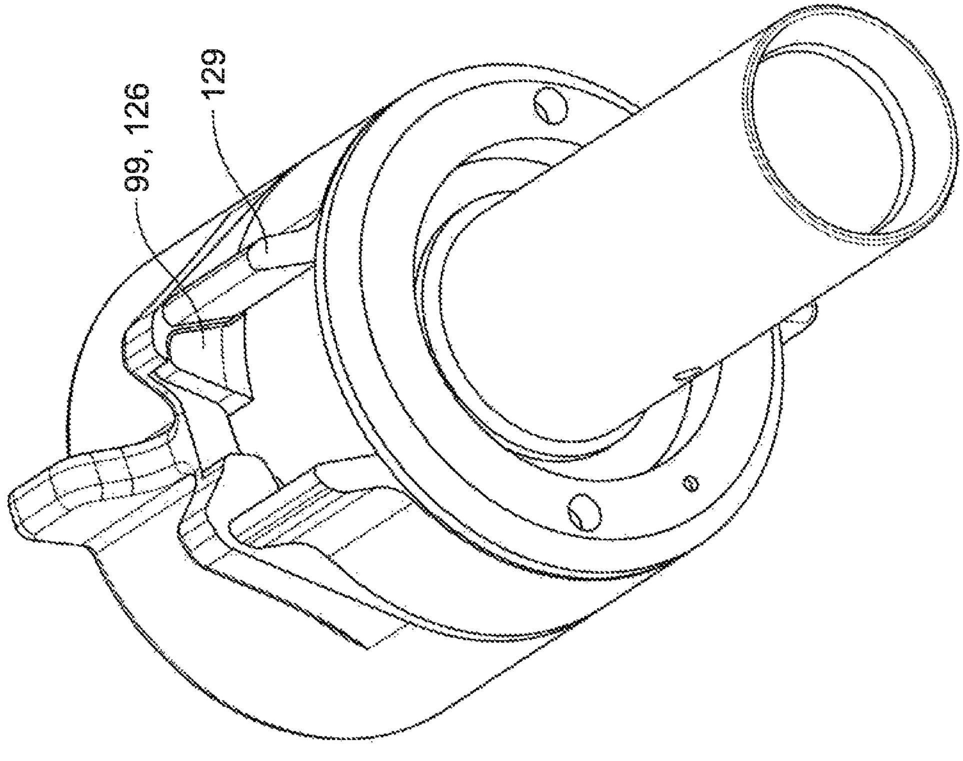
FIG. 8 illustrates the electric connector with the torque setting means in the initial locking position.

FIG. 7 shows the handling sleeve 91 in an isolated view. The handling sleeve 91 comprises a release ring 127 that is configured to assume a release state 129, in which the handling sleeve 91 is connected in a rotationally rigid manner to the release collar 79. In the release state 129 it is thus possible to unitarily rotate the release collar 79 together with the release ring 127. The release ring 127 is frictionally coupled to the release ring 79 in the release state 129. The release ring 127 has a normal state 131 (shown in FIG. 7) in which the release ring 127 and the release collar 79 are rotatable with respect to one another. As shown, the release ring 127 is formed integrally with the handling sleeve 91. To prevent accidental un-locking, the release ring 127 comprises two tabs 129 on the handling sleeve 91. Those taps 129 must be pinched to engage the frictional lock between the handling sleeve 91 and the release collar 79. The handling sleeve 91 and the release collar 79 may then be rotated together.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electric connector connectable to a mating electric connector, comprising:

an inner part adapted to be connected to an electrical conductor;

an outer part adapted to connect to the mating electric connector, the inner and outer parts connected coaxially and rotatably to one another; and a self-locking mechanism selectively blocking rotation of one of the inner or outer parts with respect to the other one of the inner or outer parts in a first circumferential direction, and permitting rotation of one of the inner or outer parts with respect to the other one of the inner or outer parts in a second circumferential direction opposite the first circumferential direction, the self-locking mechanism includes at least one spring pressed against a locking surface in a radial direction, the locking surface being a surface of one of the inner or outer parts facing towards the other one of the inner or outer parts, the at least one spring is attached to one of the inner or outer parts and an edge of the at least one spring cuts into a material of the locking surface to block rotation in the first circumferential direction.

2. The electric connector according to claim 1, further comprising at least one anti-rotation element positioned proximate the inner part and adapted to engage with a complementary anti-rotation element of the mating electric connector for preventing relative rotation between the inner part and the mating electric connector.

3. The electric connector according to claim 1, wherein the outer part includes at least one latching element adapted to fix the electric connector to the mating electric connector by rotation of the outer part with respect to the mating electric connector.

4. The electric connector according to claim 1, wherein the at least one spring is a leaf spring.

5. The electric connector according to claim 1, wherein the torque setting device includes a wave spring.

6. The electric connector according to claim 1, wherein the at least one spring is attached to one of the inner or outer parts in a torsionally rigid manner at a first end thereof, and slidingly abuts the other one of the inner or outer parts at a second end thereof opposite the first end, wherein the first end is located further in the second circumferential direction than the second end.

7. The electric connector according to claim 6, further comprising a plurality of the springs spaced apart from one another in the first and second circumferential directions.

8. The electric connector according to claim 6, further comprising a release collar rotatably mounted to the outer part and including at least one lifting element movable in the first circumferential direction between the spring and the locking surface.

9. The electric connector according to claim 8, wherein the release collar is connected to the outer part via a torsion spring, the spring resiliently holding the release collar in one rotational position.

10. The electric connector according to claim 8, further comprising a release stop limiting a rotational movement of the release collar with respect to the outer part opposite the locking surface.

11. The electrical connector of claim 8, wherein the handling sleeve further comprises a release ring for selectively coupling the handling sleeve to the release collar in a rotationally rigid manner.

12. The electric connector according to claim 1, further comprising a torque setting device including a handling sleeve attached to the outer part, the device indicating a state in which torque transmitted from the handling sleeve to the outer part exceeds a pre-set torque value.

13. The electrical connector according to claim 12, wherein the torque setting device further comprises at least one torque transmission member releasable from an initial locking position against a resilient spring force if a predetermined torque is exceeded between the inner and outer parts.

14. The electric connector according to claim 13, wherein the torque setting device defines a second locking position into which the torque transmission member is moved from the initial locking position.

15. The electric connector according to claim 14, further comprising a visual indicator element visible from outside the electric connector, a position of the visual indicator member with respect to the handling sleeve being representative of the torque setting in the initial locking position or the second locking position.

16. The electric connector to claim 15, wherein the torque setting device includes a limit stop limiting a rotational movement of the handling sleeve with respect to the outer part.

17. An electrical assembly, comprising:

an electric connector, including:

an inner part adapted to be connected to an electrical conductor;

an outer part, the inner and outer parts connected coaxially and rotatably to one another; and a self-locking mechanism selectively blocking rotation of one of the inner or outer parts with respect to the other one of the inner or outer parts in a first circumferential direction, and permitting rotation of one of the inner or outer parts with respect to the other one of the inner or outer parts in a second circumferential direction opposite the first circumferential direction, the self-locking mechanism includes at least one spring pressed against a locking surface in a radial direction, the locking surface being a surface of one of the inner or outer parts facing towards the other one of the inner or outer parts, the at least one spring is attached to one of the inner or outer parts and an edge of the at least one spring cuts into a material of the locking surface to block rotation in the first circumferential direction; and a mating electric connector coupled to the outer part.

18. The electrical assembly of claim 17, wherein the mating electric connector includes a pin engaged with the electrical conductor within the inner part.

19. The electrical assembly of claim 18, wherein the pin defines first latching elements and the outer part defines a corresponding set of second latching elements for selective coupling the outer part to the mating electric connector.

20. The electrical assembly of claim 18, further comprising a release collar rotatably mounted to the outer part and including at least one lifting element being movable in the first circumferential direction between the spring and the locking surface.

* * * * *